(12) United States Patent
Howley

(10) Patent No.: US 6,729,066 B1
(45) Date of Patent: May 4, 2004

(54) FISHING APPARATUS

(76) Inventor: Terry M. Howley, 208 S. Warner St., Bay City, MI (US) 48706

( * ) Notice: Subject to any disclaimer, the term of this patent is extended or adjusted under 35 U.S.C. 154(b) by 0 days.

(21) Appl. No.: 10/021,977

(22) Filed: Dec. 14, 2001

(51) Int. Cl.$^7$ .............................................. A01K 97/06
(52) U.S. Cl. ................................ 43/54.1; 43/55; 43/56; 43/57
(58) Field of Search ............................. 43/54.1, 55, 56, 43/57, 21.2; 206/315.11

(56) References Cited

U.S. PATENT DOCUMENTS

| | | |
|---|---|---|
| 636,694 A | 11/1899 | Pflueger |
| 777,382 A | 12/1904 | Le Beau |
| 1,444,367 A | 2/1923 | Brolliar |
| 1,876,692 A | 9/1932 | Kornsweet |
| 2,179,095 A | 11/1939 | Kelsey |
| 2,182,160 A | 12/1939 | Nelson |
| 2,314,521 A | 3/1943 | Schwartz |
| 2,507,444 A * 5/1950 | Kear ............................. 43/56 |
| 2,853,828 A | 9/1958 | Fisher |
| 2,864,195 A | 12/1958 | Bachmann |
| 3,091,882 A | 6/1963 | Dudley |
| 3,177,604 A | 4/1965 | Ewing |
| 3,186,120 A | 6/1965 | Layson |
| 3,191,337 A | 6/1965 | Fant |
| 3,344,552 A | 10/1967 | Glasco |
| 3,478,460 A | 11/1969 | Kimble et al. |
| 3,509,657 A * 5/1970 | Bross ............................. 43/57 |
| 3,510,978 A | 5/1970 | Murdock |
| 3,591,971 A | 7/1971 | Tanner |
| 3,680,245 A | 8/1972 | Brooks |
| 3,710,502 A | 1/1973 | Bracey |
| 3,831,310 A | 8/1974 | Frangullie |
| 3,955,306 A | 5/1976 | Handa |
| 4,020,580 A | 5/1977 | Chappell et al. |
| 4,021,959 A | 5/1977 | Antkowiak |
| 4,128,170 A * 12/1978 | Elliott ................... 206/315.11 |
| 4,198,776 A | 4/1980 | Tomita |
| 4,261,131 A * 4/1981 | Poffenberger .................. 43/57 |
| 4,353,182 A * 10/1982 | Junkas ....................... 43/54.1 |
| 4,452,005 A | 6/1984 | Poirot |
| 4,471,552 A | 9/1984 | McIntosh |
| 4,475,301 A | 10/1984 | Wortham |
| 4,550,518 A | 11/1985 | Layson |
| 4,569,146 A | 2/1986 | Lowrance et al. |
| 4,638,588 A | 1/1987 | Abadie |
| 4,672,764 A | 6/1987 | Dempsey |
| 4,727,672 A | 3/1988 | Hill et al. |
| 4,759,148 A | 7/1988 | Love |
| 4,763,438 A | 8/1988 | Saliaris |
| 4,864,769 A | 9/1989 | Sandahl |
| 4,916,845 A | 4/1990 | Aydelette, Sr. |
| 5,005,309 A | 4/1991 | Hall |
| 5,123,198 A * 6/1992 | Von Grossmann ............. 43/55 |
| 5,125,183 A * 6/1992 | Tisdell ....................... 43/54.1 |
| 5,249,388 A * 10/1993 | Crabtree ........................ 43/56 |
| 5,267,410 A | 12/1993 | Peyatt |
| 5,272,829 A | 12/1993 | Roberts et al. |
| 5,303,500 A * 4/1994 | Luukonen ...................... 43/55 |
| 5,305,542 A * 4/1994 | Phelps ........................... 43/57 |
| 5,305,544 A * 4/1994 | Testa .......................... 43/54.1 |
| 5,394,639 A * 3/1995 | Tentler ........................... 43/56 |
| 5,428,921 A | 7/1995 | Lancieri |

(List continued on next page.)

*Primary Examiner*—Kurt Rowan
(74) *Attorney, Agent, or Firm*—John K. McCulloch

(57) ABSTRACT

Fishing apparatus having a container forming a chamber in which caught fish and live bait may be placed and maintained separate from each other. Air is introduced to the chamber to supply oxygen sufficient to enable caught fish and live bait to remain alive. The container provides support for fishing poles, both live and dead bait, and fishing tackle. The retainer may be separated from the container and be tethered thereto. A fishing pole in use may be rested atop the container and restrained against inadvertent separation therefrom.

12 Claims, 4 Drawing Sheets

U.S. PATENT DOCUMENTS 5,471,779 A * 12/1995 Downey ..................... 43/54.1
5,551,186 A     9/1996 Harada
5,634,291 A *  6/1997 Pham ............................ 43/57
5,659,995 A *  8/1997 Hoffman .................... 43/54.1
5,799,435 A *  9/1998 Stafford ......................... 43/57
6,185,860 B1 *  2/2001 Thibodeaux ................ 43/54.1
6,487,814 B1 * 12/2002 Arredondo ................. 43/54.1

* cited by examiner

FISHING APPARATUS

This invention relates to fishing apparatus of the kind especially adapted to provide a compact, portable support for all equipment necessary to enable a person to participate in fishing.

BACKGROUND OF THE INVENTION

Fishermen conventionally use live bait, such as minnows, or dead bait, such as chum, or both, while fishing. They also conventionally have separate containers for live bait and dead bait, for various kinds of fishing lures and lines, and retainers for their catch. The necessity of having to transport multiple pieces of equipment in traveling to and from a fishing site is awkward.

If the fishing is done from a boat, the presence of multiple pieces of equipment makes it difficult in many instances to move about the boat when it becomes necessary to do so. It also makes it difficult to keep the multiple pieces handy for use when needed.

A principal objective of the invention is to overcome the difficulties referred to above.

SUMMARY OF THE INVENTION

Fishing apparatus constructed in accordance with the preferred embodiment of the invention comprises a container having a closed bottom and an upstanding side wall which, together, form a chamber capable of containing a sufficient quantity of water to enable the catch and live bait, such as minnows, to be maintained in live condition therein. The container has a cover which may be placed on and removed from the upper end of the container so as to minimize spillage of the water in the container and provide support for a fishing rod and accessories.

An aeration system is provided to enable air to be discharged into the water in the container, thereby permitting the delivery of oxygen for life support of the minnows and the catch. A pivoted bail is secured to the side wall of the container to facilitate carrying of the latter. The container side wall preferably has an opening through which caught fish may be passed into the chamber where they may remain alive until such time as the fishing activity is concluded.

The cover has an opening through which a live bait retainer may pass and the retainer preferably is in communication with the aeration system so as to enable air to be supplied to the live bait within the retainer.

The retainer also provides a convenient storage place for a quantity of dead bait which may be used independently of or in conjunction with the live bait.

The container includes on its exterior means for removably supporting a plurality of fishing rods when the latter are not in use. The container also preferably includes supports for a fishing rod when the latter is in use and which enables the rod to be supported atop the container and beneath the bail, thereby providing not only a support for the rod, but also restraint to prevent separation of the rod from the container when a fish takes the bait.

THE PREFERRED EMBODIMENT

THE DRAWINGS

The presently preferred embodiment of the invention is illustrated in the accompanying drawings wherein.

THE PREFERRED EMBODIMENT

Figure 1:
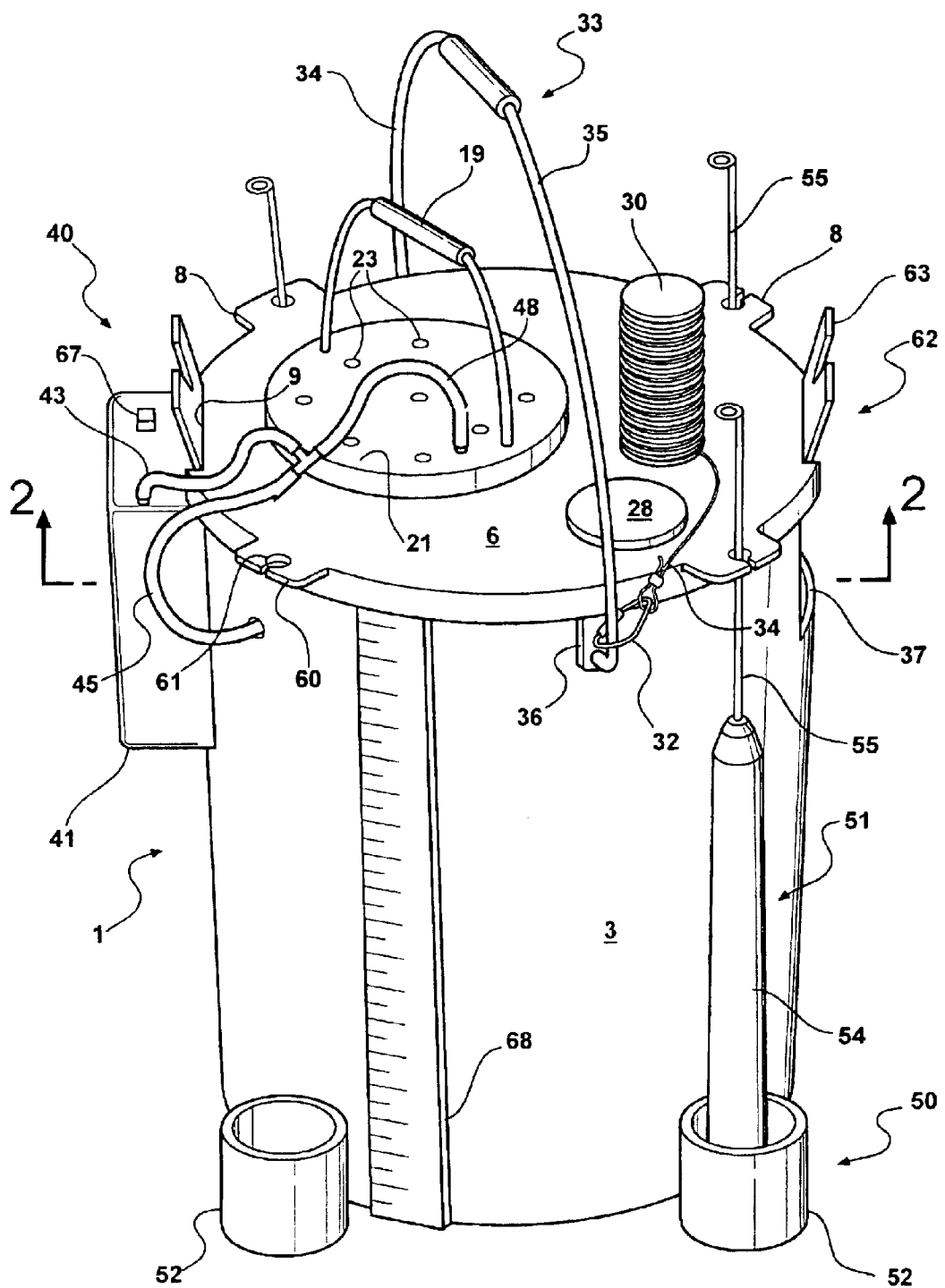
FIG. 1 is an isometric view of the apparatus in condition for transport.

Apparatus constructed in accordance with the preferred embodiment of the invention comprises a container 1 having a bottom 2 from which extends an upstanding, cylindrical side wall 3 which, together with the bottom 2, forms an interior chamber 4 of a desired volume. The bottom and the side wall are formed of molded, plastic material, such as polyethylene, or any other suitable form-stable, water impermeable, inert material which is resistant to deterioration from sunlight and both fresh and salt water. The container is adapted to be closed by a removable cover 5 formed of a material similar or corresponding to that from which the bottom and side wall of the container are formed. Preferably, such material is opaque to shield the contents of the chamber from sunlight.

The cover 5 has an upper surface 6 and at its periphery a downturned flange 7 which embraces the upper end of the container side wall 3. The cover also has a plurality of radial projections 8 circumferentially spaced from one another and a pair of diametrically opposed notches 9 for purposes which subsequently will be explained.

Figure 2:
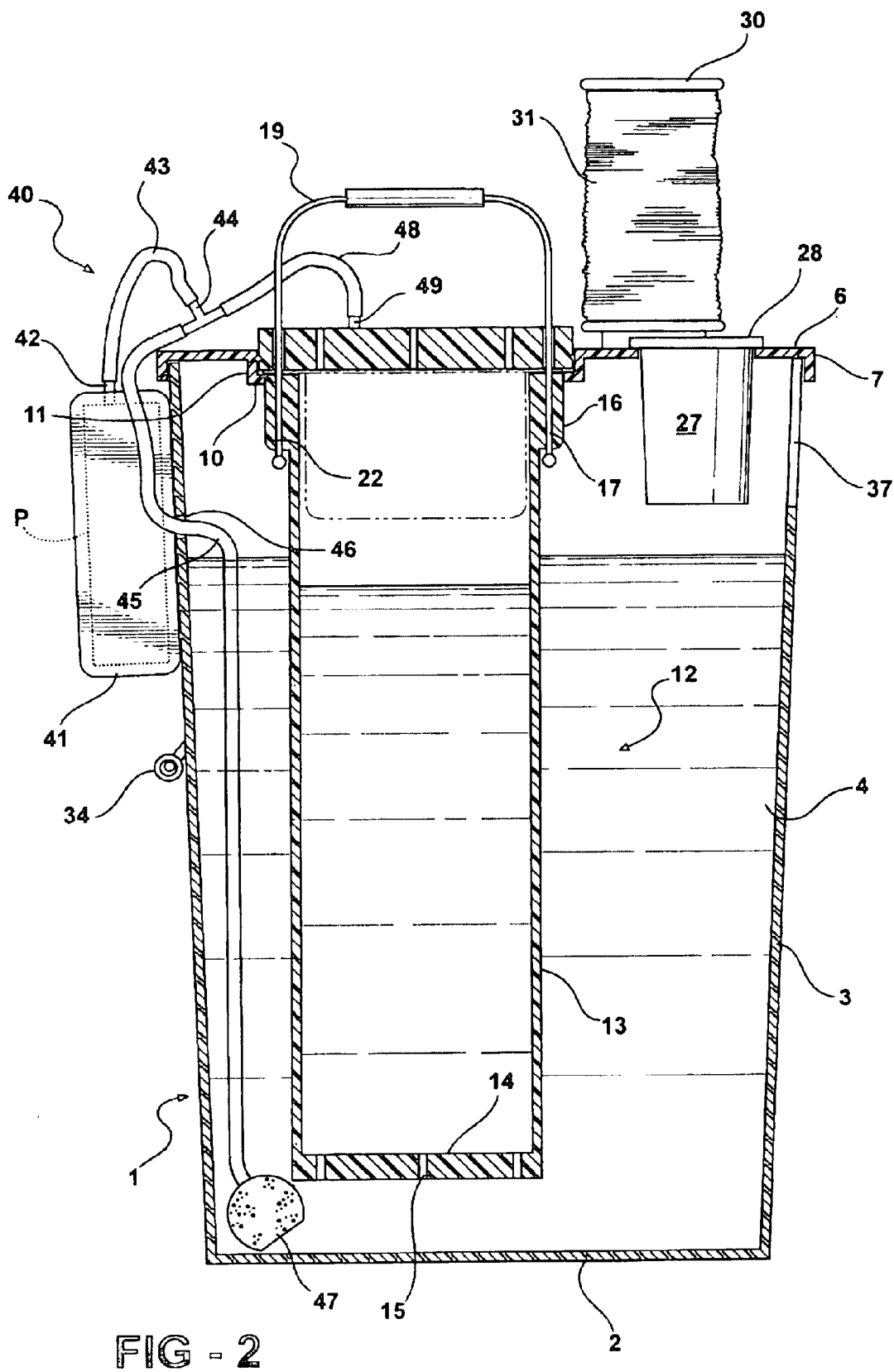
FIG. 2 is a sectional view taken on the line 2—2 of FIG. 1.
Figure 3:
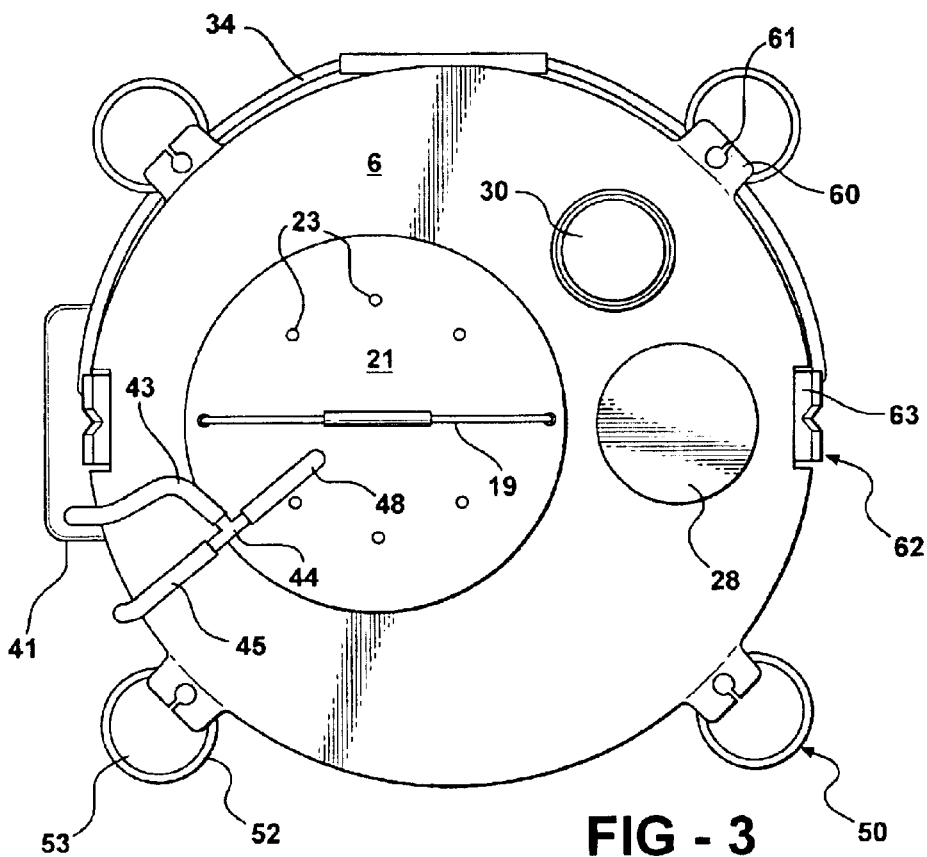
FIG. 3 is a top plan view of the apparatus, with some of the equipment shown in FIG. 1 being omitted.

As is best shown in FIG. 2 the cover 5 has an opening 10 having an adjacent, recessed ledge 11. The opening 10 is of such size as to enable a cylindrical live bait retainer 12 to be moved through the opening 11 into and out of the chamber 4. The retainer 12 comprises a side wall 13 preferably formed of transparent, plastic material, such as polystyrene, and terminating at its lower end in a bottom wall 14 having a plurality of passages 15 therein. The upper end of the retainer 12 has an annular enlargement 16 through which extends a pair of diametrally spaced openings 17 for the slideable accommodation of arms 18 of a U-shaped handle 19.

The retainer 12 includes a cylindrical closure lid 21 of such diameter as to seat on the ledge 11. The lid has openings 22 through which the arms 18 slideably extend, and other openings or air passages 23 therein.

A dish-like dead bait or chum receptacle 24 is removably accommodated in the retainer 12 at the upper end thereof and has a flange 25 of such diameter as to overlie and seat on the ledge 11.

Figure 4:
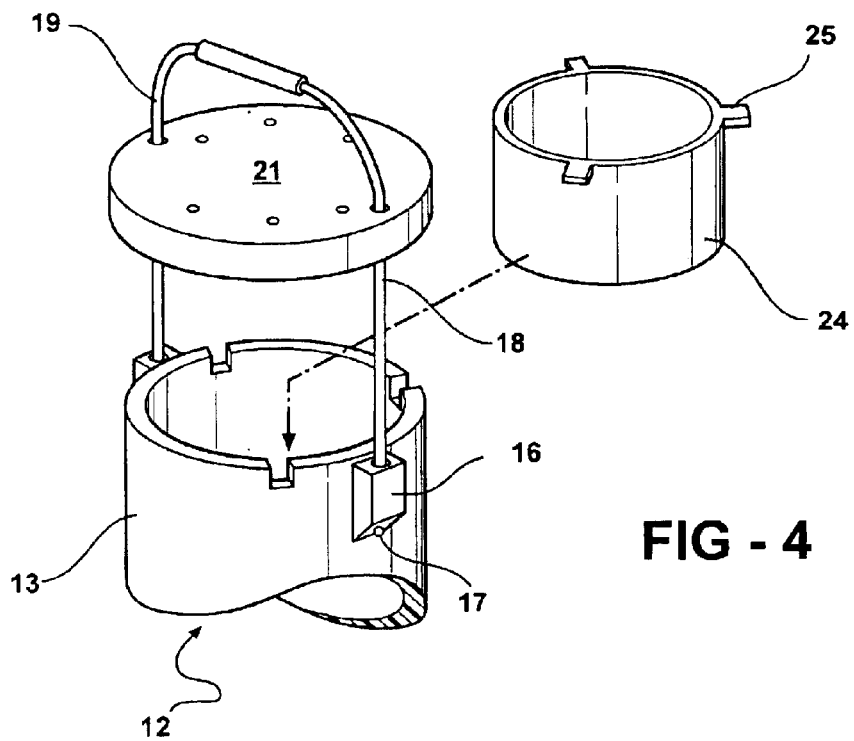
FIG. 4 is a fragmentary, isometric view of a portion of the live and dead bait retainers.
Figure 5:
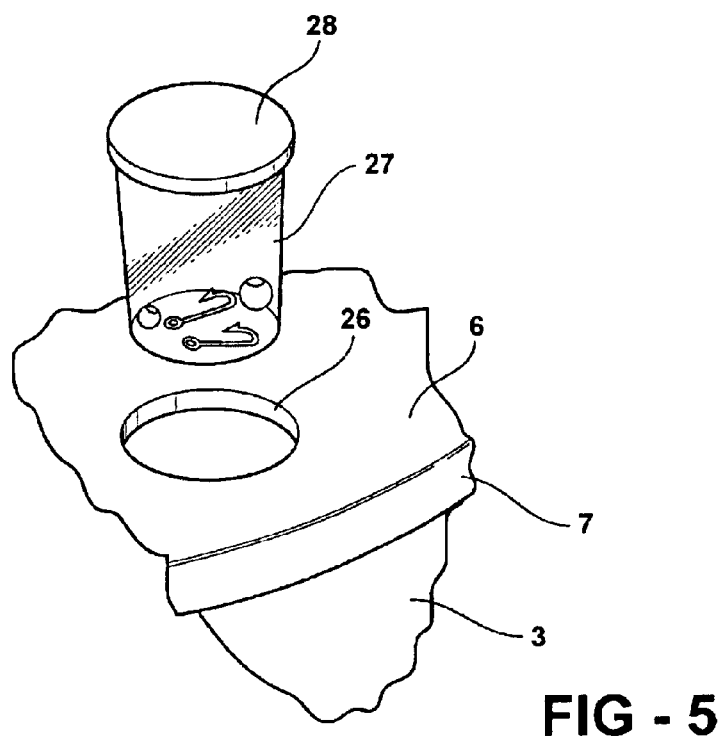
FIG. 5 is a fragmentary, isometric view of the container and a tackle storage cup.

The length of the arms 18 is such as to enable the lid 21 to be adjusted between the positions shown in FIGS. 2 and 4 so as to permit the receptacle 24 to be moved into and out of nesting relation with the upper end of the retainer 12. When the retainer is seated on the flange 11 the bottom 14 is vertically spaced from the container bottom 2.

The cover 5 also is provided with an opening 26 for the removable accommodation of a tackle storage container 27 having at its upper end a flange which overlies the cover upper surface 6 adjacent the opening 26. The container 27 also has a removable lid 28. The container 27 is adapted to accommodate fishing tackle such as hooks, sinkers, lures, and the like.

The cover 5 mounts an upstanding spindle 30 for supporting a spool of line 31 terminating at one end in a coupling 32.

The container 1 includes a bail 33 having bowed arms 34 and 35 which are pivotally connected to blocks 36 secured externally to the side wall 3 adjacent the upper end of the latter. The bail 33 provides a convenient handle by means of which the container and its contents may be moved from place to place.

It is contemplated that the chamber 4 within the container 1 may be filled with water to a selected depth sufficient to enable fish that have been caught to be maintained in live condition in such water. To facilitate passage of a caught fish into the chamber the side wall 3 is provided with an opening 37 adjacent the upper end of the wall 3.

To enable caught fish placed in the water in the chamber 4 to survive, air distribution apparatus 40 is provided and comprises a case secured in any suitable manner to the exterior of the container side wall 3 and within which are batteries (not shown) and an air pump P of conventional construction. The case 41 has air inlets in communication with the intake side of the air pump, the output side of which communicates with a nipple 42 coupled by a conduit or hose 43 to a tee fitting 44. One side of the fitting 44 is coupled to a hose 45 which extends through an opening in the container side wall 3 and terminates at its free end in a diffuser 47 positioned adjacent the bottom 2 of the container so as to discharge life-supporting air into water in the chamber near the bottom thereof. Some of the air discharged from the diffuser 47 may enter the live bait retainer 12 via the openings 15 in the bottom wall 14, thereby enabling oxygen to be available for minnows in the retainer 12. To avoid an air lock in the retainer the flange 25 may be slotted or notched thereby enabling air to pass out of the retainer.

The air pump preferably is coupled to the interior of the live bait retainer 12 via a conduit 48 and a nipple 49 which extends through the lid 21 into the interior of the retainer 12. The flow of air into the upper end of the retainer provides ventilation therefor and prevents the accumulation of objectionable odors in those instances in which the container 24 contains chum or other dead bait.

The apparatus includes a plurality of supports 50 for the removable support of fishing rods 51. Each of the supports 50 comprises a cup-like member having an annular wall 52 and a bottom 53. Each support 50 is adhesively or otherwise suitably secured to the container side wall 3 adjacent the lower end of the latter and is of such size as freely to accommodate the butt end 54 of a fishing rod 51. Each fishing rod 51 also includes an elongate stem 55 terminating at its free end in an eye 56. The fishing rod 51 may or may not include a reel 57 on which a fishing line 58 is wound.

The cover 5 has a number of radially projecting, rod-retaining tongues 60 each of which has a key-hole opening 61 for the removable accommodation of the stem 55 of a fishing rod. The rod-retaining tongues 60 are circumferentially spaced to conform to the spacing of the supports 50 so that one of the tongues 60 overlies one of the supports 50.

The apparatus preferably includes a pair of fishing rod rests 62 each of which comprises an upright flange 63 joined at its lower end to a clasp formed by a pair of spaced, parallel arms 64 and 65 adapted to embrace the upper edge of the container side wall 3. Each of the flanges 63 has a notch 66 therein of such size as to accommodate either the butt end or the stem of a fishing rod. The rests 62 as so positioned on the container side wall as to correspond to the positions of the notches 9 in the cover 5.

To condition the apparatus for use, the chamber 4 is filled to a suitable level with water. Live minnows may be introduced to the interior of the retainer 12 and the latter placed in the container in such manner that water enters the interior of the retainer via the openings 15. The lid 21 may be placed atop the retainer 12 as is shown in FIG. 2, following which the air pump within the case 40 may be actuated by operation of an on-off switch 67 on the case so as to provide oxygen for the minnows in the retainer 12. If dead bait is to be used, such bait may be placed in the receptacle 24 and the latter positioned within the retainer 12 adjacent the upper end thereof.

Fishing rods 51 may be placed in the supports 50 and have their stems 55 inserted into the key-hole slots 61 so they will be in readiness for use.

When the fishing site is reached, the fishing rods may be removed from their supports, the lid 21 raised, and bait removed from the retainer 12 and/or the receptacle 24. Raising the lid and removal of bait may be facilitated by swinging the bail 33 to a position alongside the wall 3.

If desired, the retainer 12 may be removed from the container 1, either with or without the dead bait receptacle 24, and submerged in the body of water that is intended to be fished. If desired the dead bait receptacle may be supported by its flange 25 on the ledge 11, or it may remain in the retainer. If the retainer is submerged in the water at the fishing site, it may be tethered by joining the coupling 32 to the handle 19.

If the side wall of the retainer 12 is transparent, as is preferable, the minnows within the retainer may function as decoys for transient fish. If the dead bait in the receptacle 24 is to be used, it can be removed from the receptacle and scattered at the fishing site, as is common when utilizing chum. Alternatively, it may be retained in the receptacle within the retainer. The scent of the dead bait may be discharged from the receptacle via the openings 23 in the lid 21. The arms 18 of the bail 19 are bowed in their unstressed condition so as to facilitate their frictional engagement with the lid 21, thereby enabling the lid to be maintained in place atop the retainer without necessitating the use of a latch.

Figure 6:
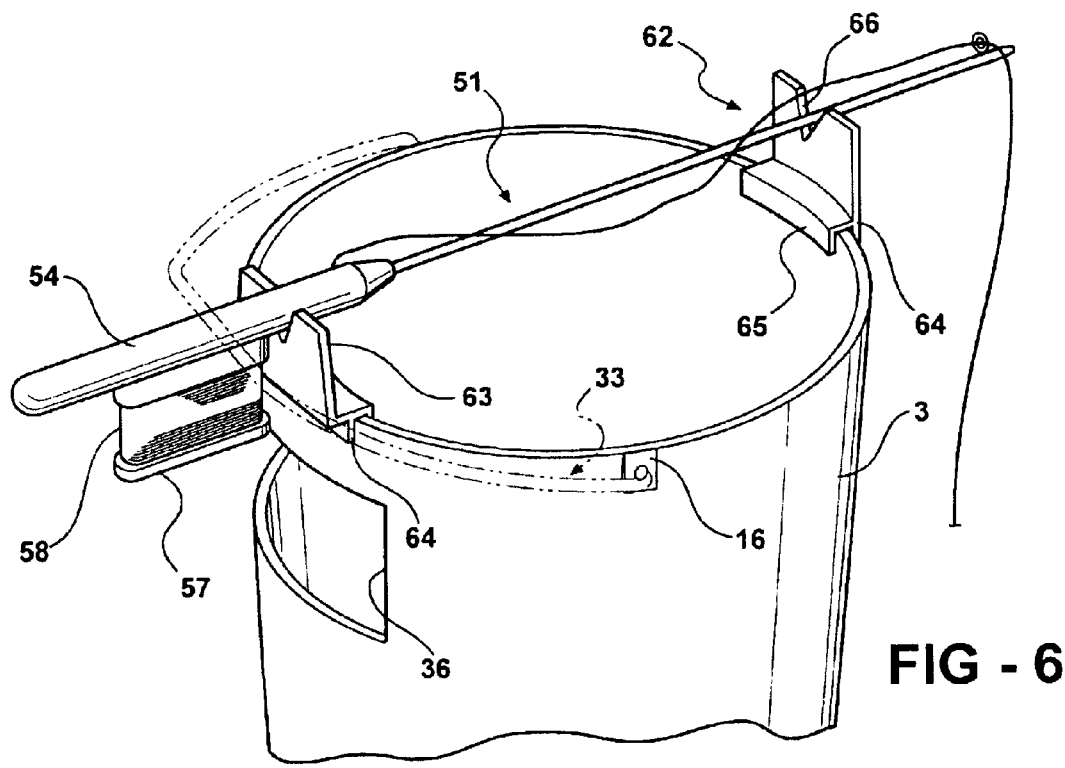
FIG. 6 is a fragmentary, isometric view illustrating the manner in which a fishing rod may be used in conjunction with the container.

The fishing rods 51 may be used in the conventional manner. If it is desired to use, but not manually hold, one of the rods, it may be so placed that it spans the rests 62, as is shown in FIG. 6. To assist in securing such fishing rod without appreciable risk that it inadvertently will be dislodged from the rod rests, the bail 33 may be rocked to the position shown in FIG. 7 in which it overlies the butt end of the rod.

As fishing continues any fish caught may be introduced to the chamber within the container via the opening 37 in the side wall 3. As long as the live bait retainer is within the chamber, no change in the air distribution system as shown in FIG. 2 need be made. If the retainer 12 is withdrawn from the chamber, however, then the hose 48 should be removed from the nipple 49 and a plug placed in the free end of the hose 48 to ensure the delivery of air into the water in the chamber 4.

If there is doubt as to length of any caught fish, it may be resolved by measuring the fish on a scale 68 applied to the outside of the container side wall.

The disclosed embodiment is representative of a presently preferred form of the invention, but is intended to be illustrative rather than definitive thereof. The invention is defined in the claims.

I claim:

1. Fishing apparatus comprising a container having a bottom and an upstanding side wall together forming an open top chamber for containing a quantity of water sufficient to accommodate live fish; a cover overlying said chamber and removably supported on said side wall; an air pump carried by said container; air distribution means extending from said pump into said container for discharging air into said chamber adjacent said bottom; a tubular live bait retainer having an upper end and an interior, said retainer being supported by and extending through said cover into said chamber, said retainer having openings therein through which water and air from said chamber may pass into the interior of said retainer; and diametrally opposed fishing rod rests carried by said container and extending upwardly beyond said cover, each of said rests having a fishing rod-accommodating notch therein, each of said rod rests having a flange in which said notch is formed and a clasp depending from said flange, said clasp comprising a pair of parallel arms spaced from one another a distance to accommodate therebetween a portion of the side wall of said container.

2. The apparatus according to claim 1 wherein said air distribution means includes a conduit extending from said pump in direct communication with the interior of said retainer.

3. The apparatus according to claim 1 wherein said retainer when accommodated in said chamber has a bottom wall confronting the bottom of said container and a closure lid adjacent said cover, said lid being movable between positions in which it selectively opens and closes said retainer.

4. The apparatus according to claim 3 wherein said bottom wall of said retainer has openings therein for the passage of air and water from said chamber into said retainer.

5. The apparatus according to claim 4 wherein said closure lid has openings therein for the passage of air from said retainer.

6. The apparatus according to claim 1 wherein said cover is recessed for the accommodation of said rests.

7. The apparatus according to claim 1 including a bait receptacle removably accommodated in said retainer adjacent said cover, said bait receptacle having a flange overlying and removably supported on said retainer at said upper end thereof.

8. The apparatus according to claim 1 including a bail pivotally secured to said container adjacent said top for swinging movements between adjusted positions in which said bail selectively lies alongside said side wall or overlies said cover in a position to bear upon a fishing rod supported by said rod rests.

9. Fishing apparatus comprising a container having a bottom and an upstanding side wall together forming an open top chamber for containing a quantity of water sufficient to accommodate live fish, said side wall having an opening therein through which live fish may pass into said chamber; a cover overlying said chamber and removably supported atop said side wall; an air pump carried by said container; air distribution means extending from said pump into said container for discharging water into said chamber adjacent said bottom; a tubular live bait retainer supported by and extending through said cover into said chamber, said retainer having openings therein through which water and air from said chamber may pass into said retainer; a carrying bail pivotally mounted on said side wall for swinging movement from a substantially vertical position overlying said cover to a substantially horizontal position to provide clearance for removal of said retainer independently of or conjointly with said cover; and a pair of fishing rod rests carried by said container at diametrically opposite sides thereof for supporting a fishing rod in a substantially horizontal position atop said cover and between said cover and said bail.

10. The apparatus according to claim 9 including a lid for said retainer at its upper end; means mounting said lid for movements between positions in which said retainer selectively is open and covered by said lid, said lid having openings therein through which air may pass from said retainer when said retainer is covered by said lid.

11. The apparatus according to claim 10 including a dead bait carrier removably supported by said retainer adjacent said upper end thereof, said lid when in its open position providing sufficient clearance between said lid and the upper end of said retainer to enable said carrier to pass between said lid and said upper end.

12. The apparatus according to claim 10 wherein said air distribution means includes an air conduit for delivering air from said pump to said retainer through said lid.

* * * * *